Patented Dec. 17, 1935

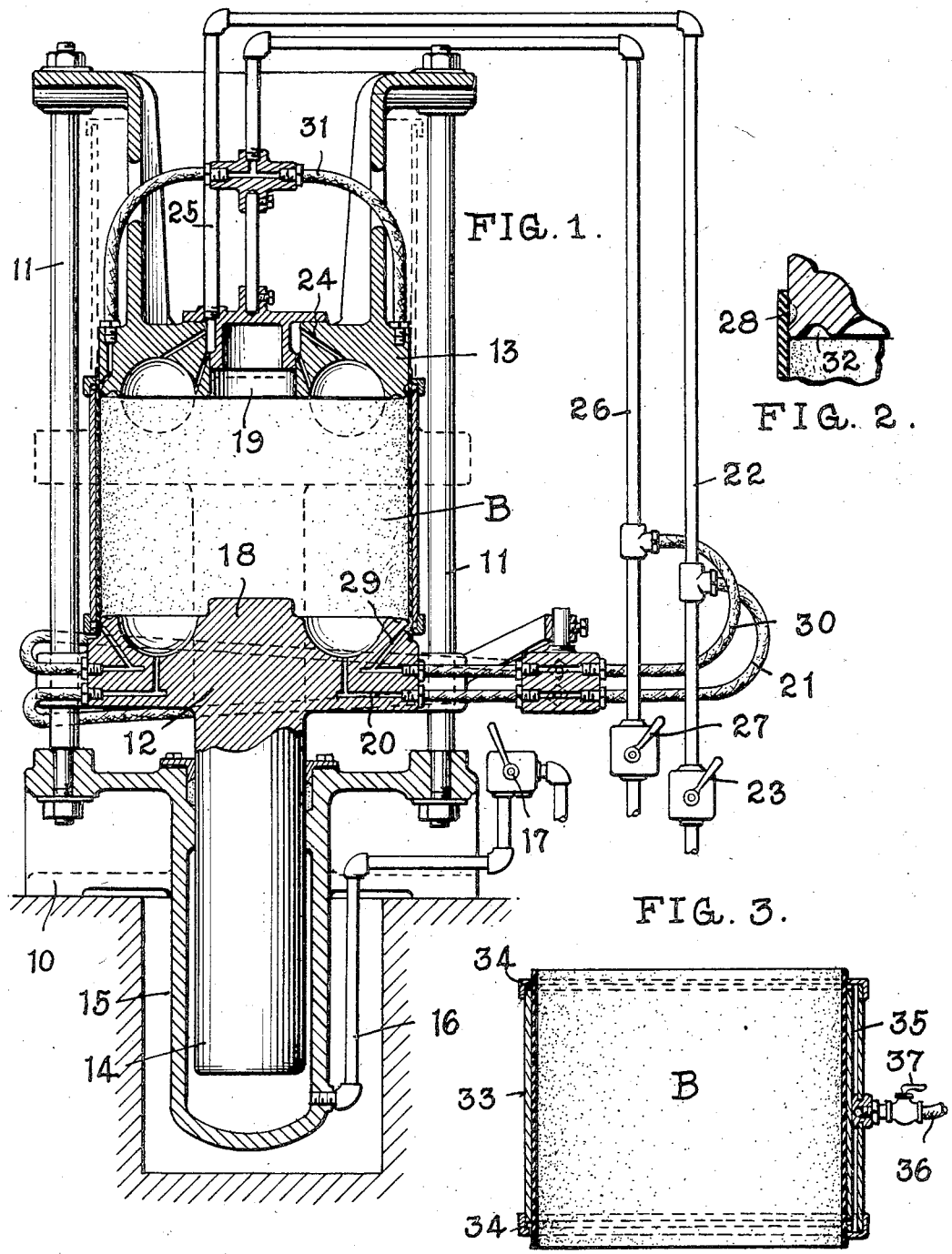

2,024,149

UNITED STATES PATENT OFFICE 2,024,149

METHOD OF AND APPARATUS FOR FORMING HOLLOW ARTICLES SUCH AS TIRE TUBES

Frank A. Daly, Pawtucket, R. I., assignor to William Wallace Potter, Pawtucket, R. I.

Application November 16, 1932, Serial No. 642,968

6 Claims. (Cl. 154—14)

My invention relates to the production of such articles as tire tubes of rubber and has for its particular object the production of inner tubes for tires known as "Doughnut" tires whose central hole is of small diameter,—a circumstance that presents problems for the manufacture thereof by apparatus available for tires with holes of larger diameter.

In carrying out or practicing my invention, considering the case of a tire tube, I employ opposite complementary dies or molds movable towards and from one another by movement of one or both thereof, with which are used a blank in the form of a hollow cylinder of uncured rubber which is subject to pneumatic pressure either vacuum or super-atmospheric which causes the cylindrical blank to reduce its diameter as the molds approach and to conform with the mold contours (each a semi-circle and the two, therefore, being a complete circle) while the end edges of the tube blank are brought together on the periphery of the forming tire tube and are joined or united in a seam that extends about the external circumference of the completed tube, no seam, of course, being formed on the inner periphery of the tube.

My invention, however, consists of whatever is described by or is included within the terms or scope of the appended claims.

In the drawing:

Fig. 1 is a vertical section of apparatus embodying my invention and in the operation of which my method may be practiced;

Fig. 2 is a detail view on a larger scale in section;

Fig. 3 is a detail view in section showing the tube blank held by the mandrel or drum ready for placing in the press.

Describing in detail what is shown in the drawing as one embodiment of my invention, there is a base 10, with spaced vertical rods or columns 11, which form supports and guides for the vertically movable lower mold or die 12, and elevated supports for the stationary upper mold or die 13, for in the instance shown, the lower mold is vertically movable to and from the upper mold and the latter is stationary. The opposing faces of the two molds have complementary annular cavities, one in each, which in cross-section are semi-circular and, therefore, have the form and contour corresponding with the product, that is, the inner tire tube.

The bottom mold is integral with or mounted upon the upper end of the piston 14, of a hydraulic cylinder 15 (whose detailed construction need not be set forth), with the bottom of which is connected a fluid pressure pipe 16, connected with a source of pressure supply and provided with a hand valve 17, for manipulation to cause the lifting or allow the lowering of the bottom die.

One mold or die, the bottom one as shown, has a central boss 18, which when it meets the upper die enters a central recess 19, which it closely fits so as to constitute a pilot or guiding and supporting means for securing accurate registry or positioning of the two dies when brought together.

Connected with the lowest part of each mold cavity as by a passage 20, in the case of the bottom die, as by a flexible hose or pipe 21, is a pipe 22, in communication with a vacuum supply or source, the pipe having a hand valve 23, for controlling the vacuum. In the case of the upper mold or die, a passage 24, leads from the mold cavity and by communication with a pipe 25, likewise has a connection with the vacuum pipe 22, having the control valve 23.

On the periphery of each mold adjacent the face thereof that meets the mating mold is an annular channel 28, which by a passage 29, is connected by a hose 30, in the case of the bottom die and by a hose 31, in the case of the upper die with the vacuum pipe 26, so that when in the operation of the apparatus the cylindrical blank has its edges over said annular grooves 28, such edges will be tightly held to the respective molds or dies.

Adjacent each vacuum channel 28, and at the corner of each mold is a round-edge annular lip 32, the two lips coming together upon interposed portions of the blank and will unite them by pressure thereon and sever or cut off the excess material to make a clean seam in the finished product.

The hollow cylindrical blank B, of uncured rubber is preliminarily supported by being placed within a hollow cylindrical mandrel 33, a little shorter than the length of the blank and which at each end has an annular groove 34, which by a pipe 35, is connected with a vacuum hose 36, provided with a control valve 37, so that by the reduced pressure on the side of the blank next the interior of the drum or mandrel 33, the blank will be securely held to the mandrel.

The upper die is supported sufficiently below the points of its connection with the vertical frame rods as to allow the upward movement thereover of the blank-supporting drum or mandrel in the operation about to be described for the production of a tire tube.

With the bottom mold in its lowermost position, the blank-supporting mandrel or drum with the blank held thereto by vacuum, as has been described, is placed with its lower edge upon the lower mold to present the inner side of the blank at the bottom over the vacuum-connected groove 28 in the periphery of the die and with the upper edge of the blank over the vacuum-connected groove 28 in the periphery of the upper die. By manipulation of valve 27, said peripheral grooves are then subjected to a vacuum which causes lower and upper edges of the blank tightly to grip against the periphery of the dies or molds, and by manipulation of the valve 37, the vacuum grip of the mandrel on the blank ends is released. The valve controlling pressure to the hydraulic press is then manipulated to cause the bottom die to move upward to the upper die and at the same time valve 23, is manipulated to apply vacuum gradually to the mold cavities of the two dies or molds, with the result that the portion of the rubber blank between the gripped ends is drawn inward away from the mandrel and caused finally to conform to the blank cavity contours, as indicated in dotted lines in the drawing, and what were the end edges of the blank are brought together and united in a seam on the outer circumference of the tube, and the excess material cut off.

Valves 23 and 27 are then manipulated to shut off the vacuum and by the release of pressure on the piston of the hydraulic cylinder, the lower die descends to its lowest position, permitting the removal of the blank-supporting mandrel or drum and the removal of the finished tube. It will be evident that instead of using a vacuum on the interior of the blank to cause it to move inward away from the supporting mandrel or drum, pressure could be applied to the outer side of the blank with the same action thereon.

What I claim is:

1. A method which includes the acts of supporting between complementary spaced apart molds an elongated blank and then causing the inward collapse of said blank concurrently with the shortening of the length thereof and bringing together originally spaced apart portions thereof and securing the same together.

2. A method which includes the acts of supporting between complementary spaced apart molds an elongated blank and then causing the inward collapse of said blank concurrently with the shortening of the length thereof and bringing together originally spaced apart portions thereof and securing the same together in a circumferential seam on the external periphery of the resulting article.

3. A method which includes the acts of supporting between complementary, spaced apart molds an elongated blank upon a mandrel temporarily attaching the blank at opposite ends to such molds and freeing the blank from said mandrel and then causing the radial movement of the blank walls concurrently with shortening the length thereof, bringing opposing portions of the blank walls into contact and uniting them in an annular tube of substantially circular cross-section.

4. Apparatus comprising molds with opposing complementary cavities one mold being movable towards and from the other, and means supporting a flexible blank in position between the two molds when spaced apart such means being in external supporting contact with the blank, the blank being unsupported on its interior between the mold faces.

5. Apparatus comprising molds with opposing complementary cavities one mold being movable towards and from the other, means supporting a flexible blank in position between the two molds when spaced apart such means being in external supporting contact with the blank, the blank being unsupported on its interior between the mold faces, and pneumatic means for securing the blank to and releasing it from the supporting means.

6. Apparatus comprising molds with opposing complementary cavities one mold being movable towards and from the other, means supporting a flexible blank in position between the two molds when spaced apart such means being in external supporting contact with the blank, the blank being unsupported on its interior between the mold faces, and means for subjecting such blank to pneumatic pressure that causes radial movement of the walls thereof inwardly.

FRANK A. DALY.